Figure 9:
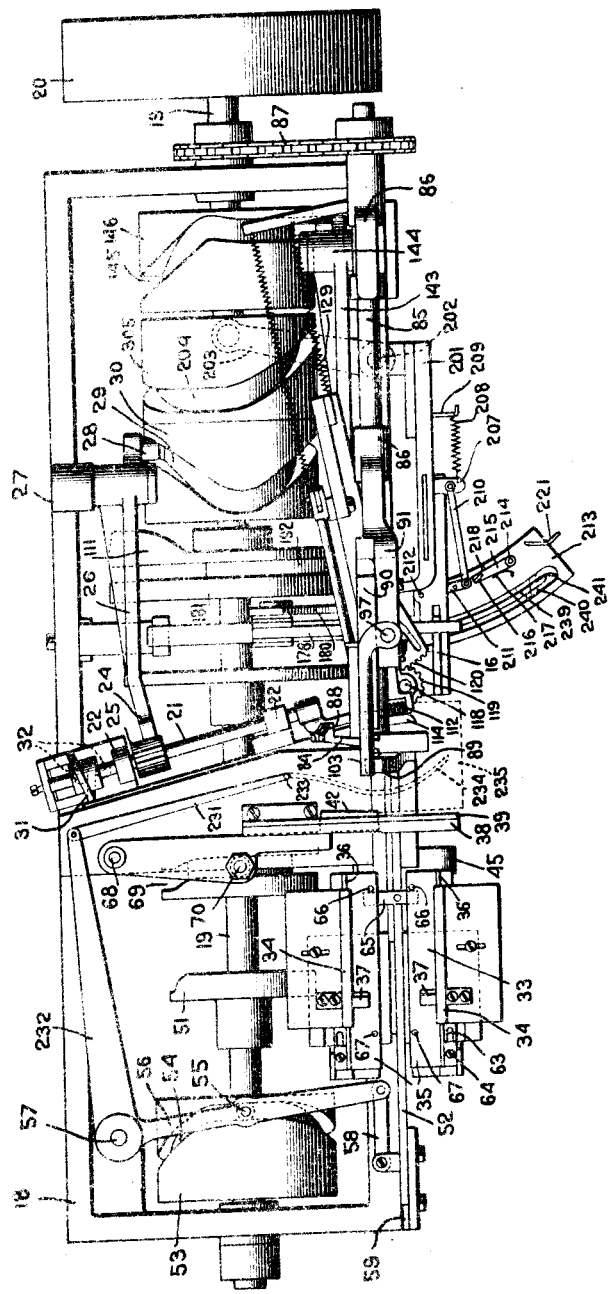

L. A. McGRATH.
TAG STRINGING MACHINE.
APPLICATION FILED MAR. 26, 1915.
1,178,932.
Patented Apr. 11, 1916.
8 SHEETS—SHEET 1.
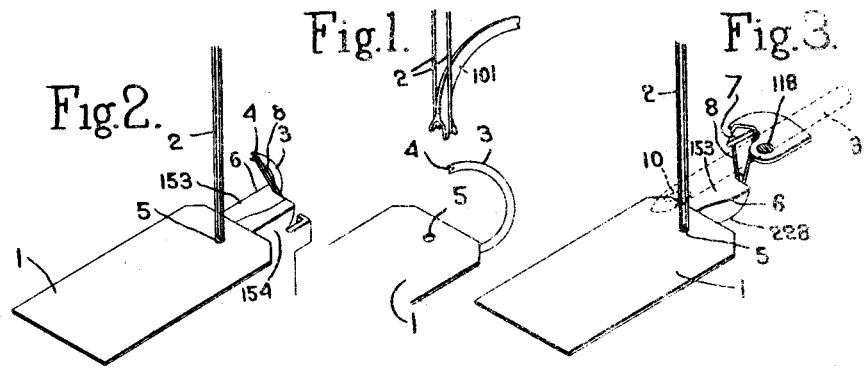
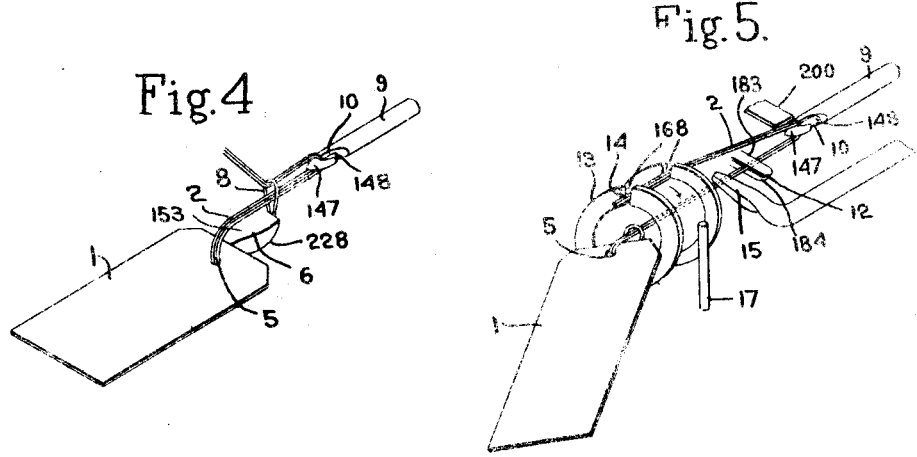
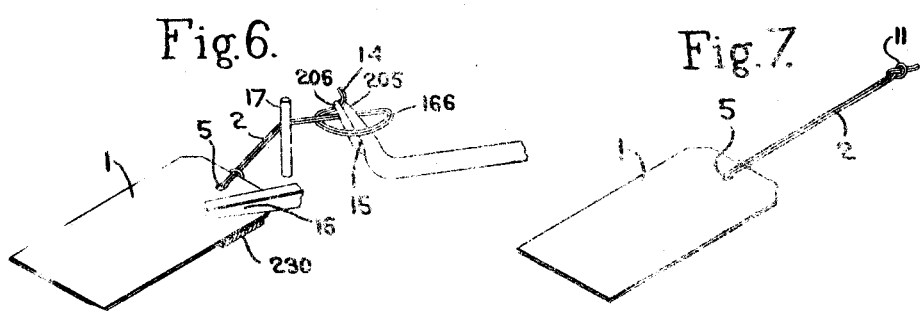
Inventor
Lawrence A. McGrath
by Heard Smith & Ten

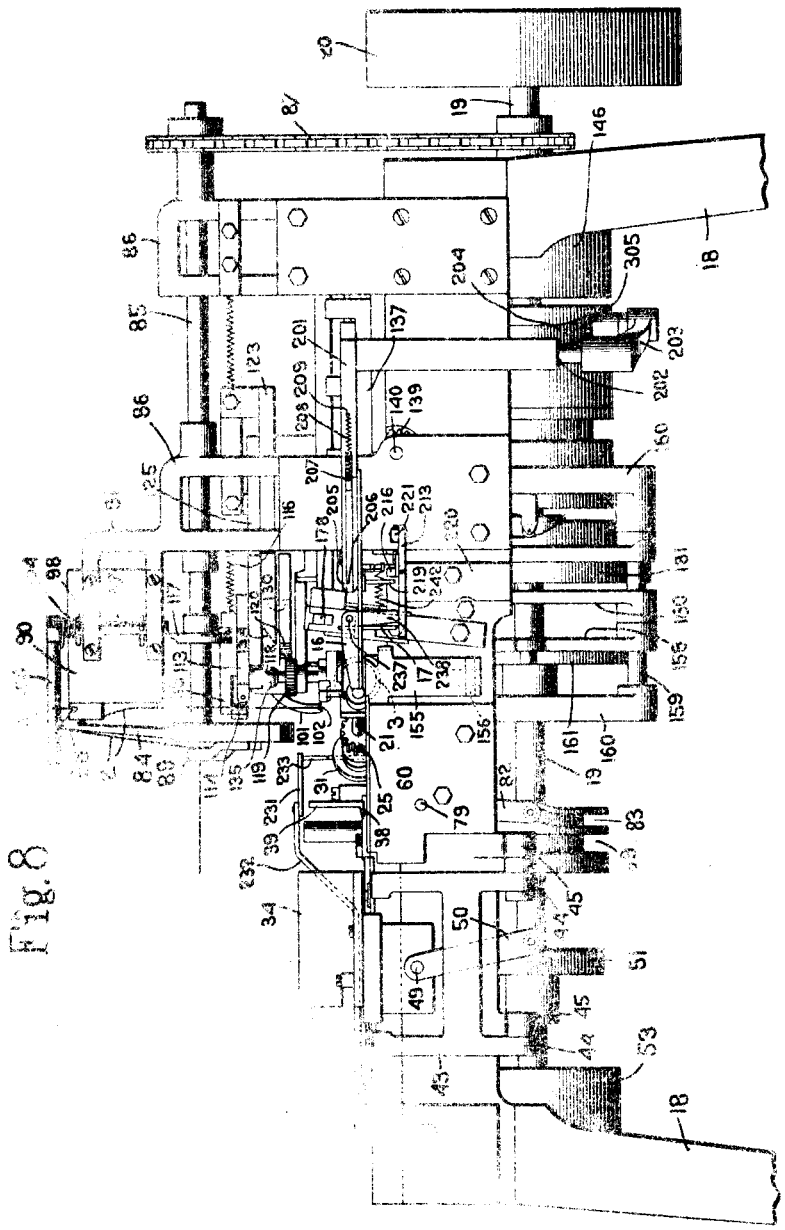

L. A. McGRATH.
TAG STRINGING MACHINE.
APPLICATION FILED MAR. 26, 1915.

1,178,932.

Patented Apr. 11, 1916
8 SHEETS—SHEET 3.

Inventor.
Lawrence A. McGrath,
by Heard Smith & Tennant.
Att'ys.

L. A. McGRATH.
TAG STRINGING MACHINE.
APPLICATION FILED MAR. 26, 1915.

1,178,932.

Patented Apr. 11, 1916.
8 SHEETS—SHEET 5.

Inventor
Lawrence A. McGrath,
by Heard Smith & Tennant
Atty's.

L. A. McGRATH.
TAG STRINGING MACHINE.
APPLICATION FILED MAR. 26, 1915.
1,178,932.
Patented Apr. 11, 1916.
8 SHEETS—SHEET 6.
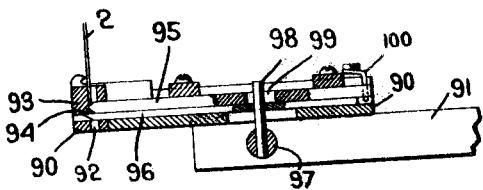
Fig.15.
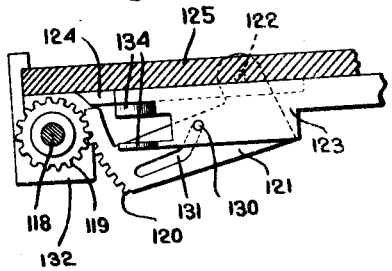
Fig.18.
Fig.16.
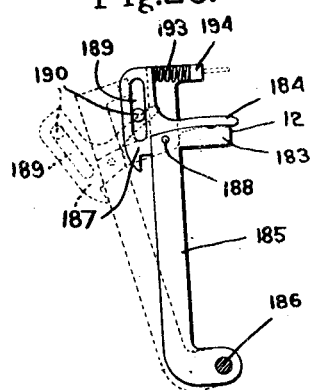
Fig.20.
Fig.19.
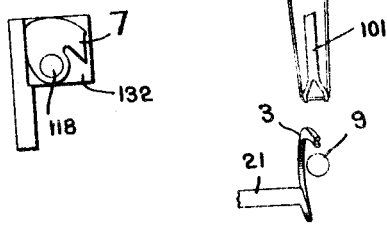
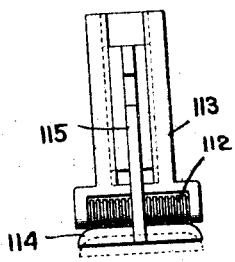
Fig.17.
Inventor.
Lawrence A. McGrath.
by Heard Smith & Tennant
Atty's.

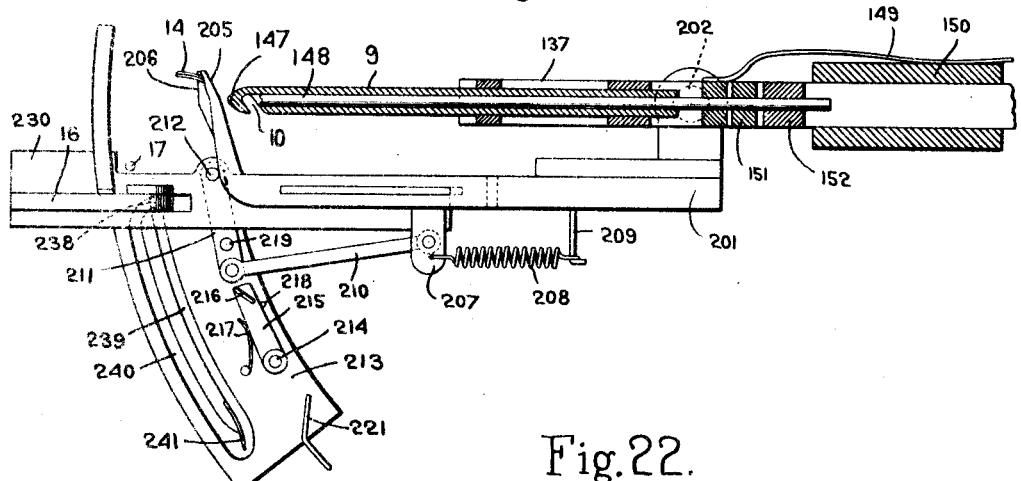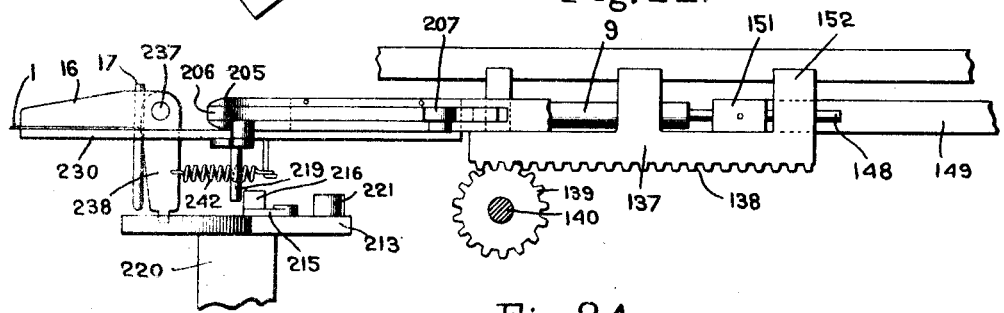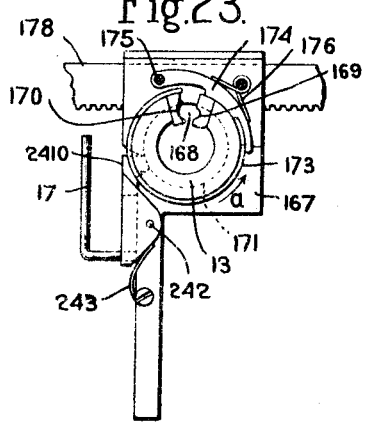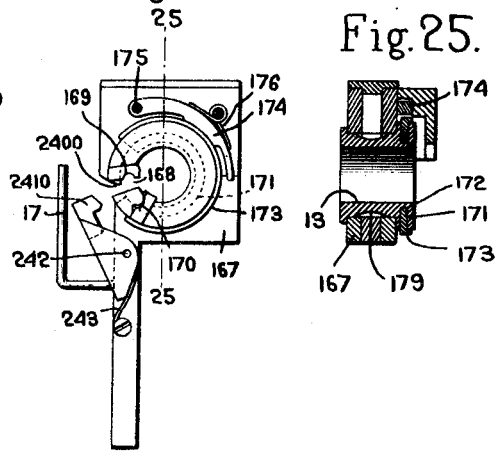

L. A. McGRATH.
TAG STRINGING MACHINE.
APPLICATION FILED MAR. 26, 1915.

1,178,932.

Patented Apr. 11, 1916.
8 SHEETS—SHEET 8.

Inventor.
Lawrence A. McGrath,
by Heard Smith & Tennant
Atty's.

UNITED STATES PATENT OFFICE.

LAWRENCE A. McGRATH, OF RANDOLPH, MASSACHUSETTS, ASSIGNOR OF FOUR-SIXTEENTHS TO MICHAEL F. CUNNINGHAM, OF RANDOLPH, MASSACHUSETTS, FIVE-SIXTEENTHS TO MARY E. DONOVAN, OF WINTHROP, MASSACHUSETTS, AND TWO-SIXTEENTHS TO WILLIAM H. DENNEHY.

TAG-STRINGING MACHINE.

1,178,932.   Specification of Letters Patent.   Patented Apr. 11, 1916.

Application filed March 26, 1915. Serial No. 17,262.

*To all whom it may concern:*

Be it known that I, LAWRENCE A. McGRATH, a citizen of the United States, and resident of Randolph, county of Norfolk, State of Massachusetts, have invented an Improvement in Tag-Stringing Machines, of which the following description, in connection with the accompanying drawing, is a specification, like characters on the drawing representing like parts.

This invention relates to machines for stringing tags and tying a knot in the string, and one of the objects of the invention is to provide a machine of this character in which these operations are automatically and rapidly performed.

The device comprises a magazine for receiving a plurality of tags, means for withdrawing the lowermost tag from the magazine and presenting it to the stringing mechanism, means for introducing a loop of string through the eye of the tag and drawing the ends of the string through said loop thereby to string the tag, and means to loop the end of the string about the body thereof and to draw the end through the loop thus formed thereby to form a knot in the end of the string.

In order to give an understanding of my invention I have illustrated herein a selected embodiment thereof which will now be described, after which the novel features will be pointed out in the appended claims.

Figure 10:
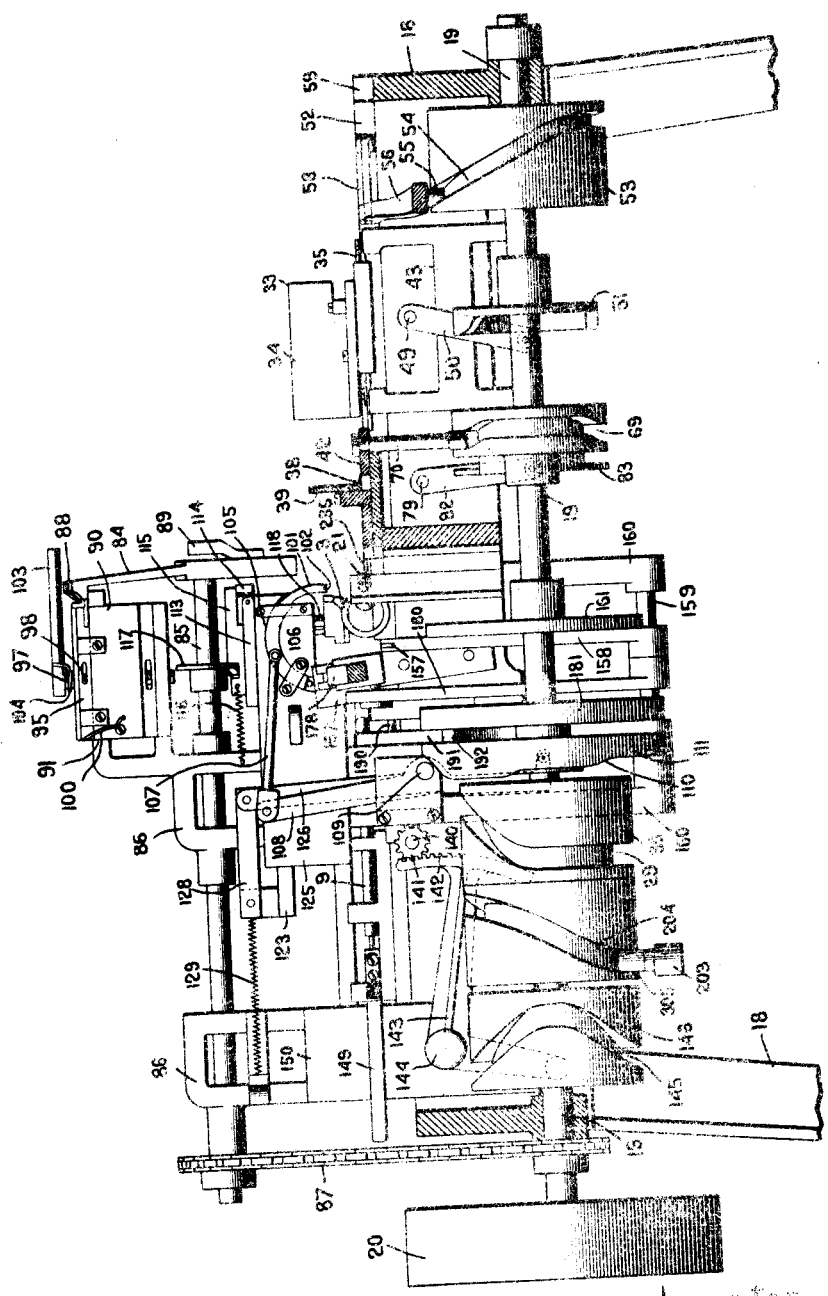
Figure 11:
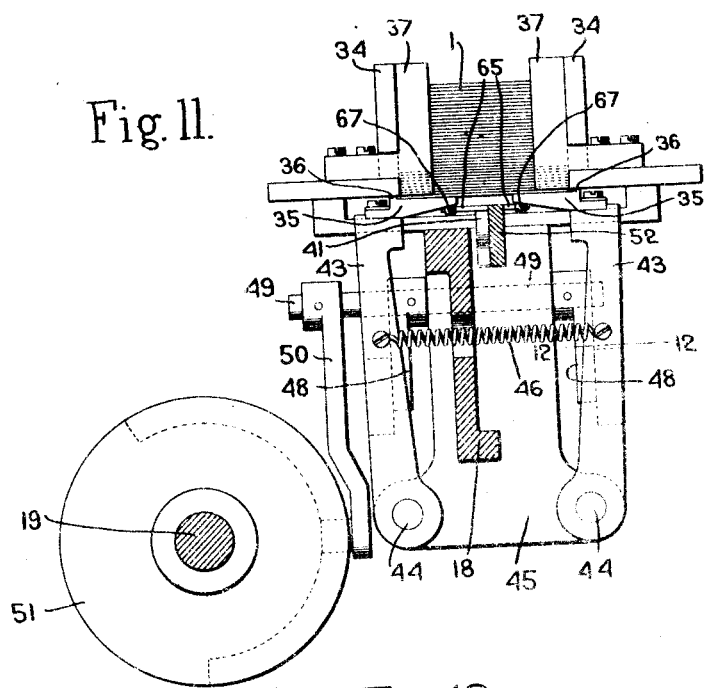
Figure 12:
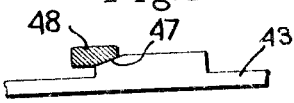
Figure 13:
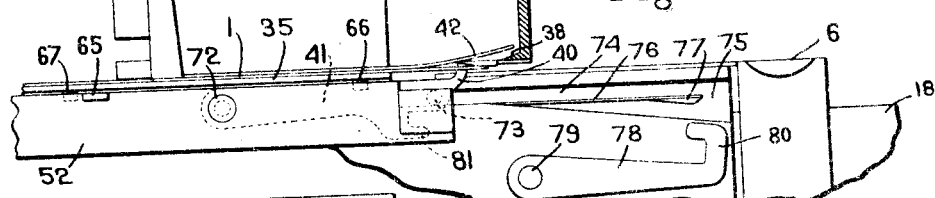
Figure 14:
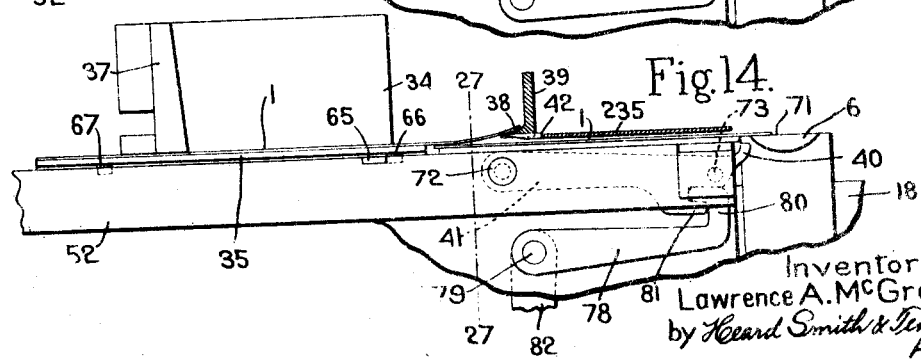
Figure 26:
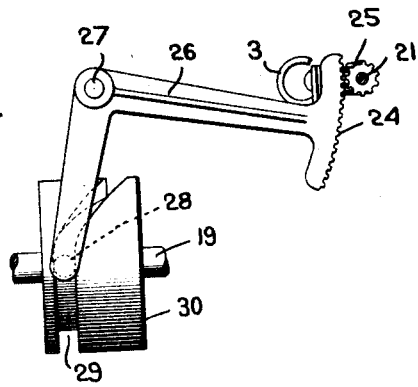
Figure 27:
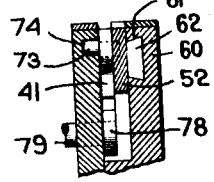
Figure 28:
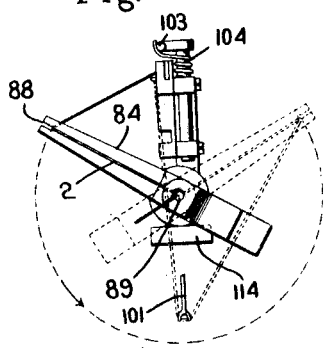
Figure 29:
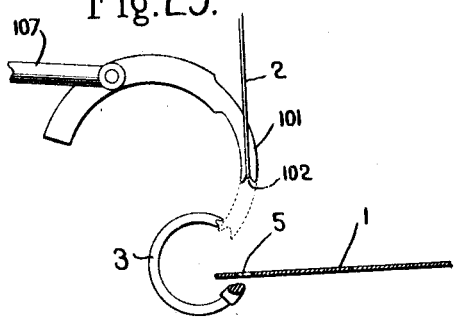
Figure 30:
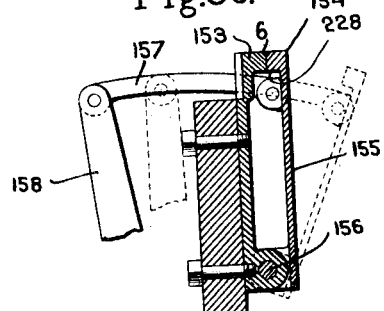
Figure 31:
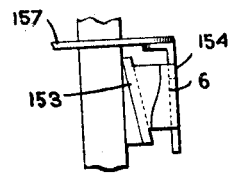
Figure 32:
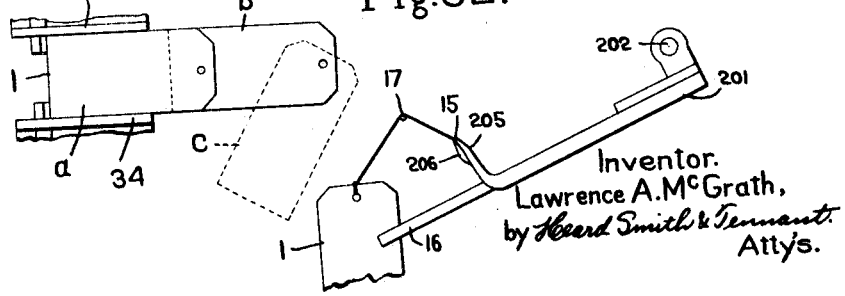

Figures 1 to 7 are diagrammatic views showing various steps in the process of stringing the tag and tying the knot in the string; Fig. 8 is a side elevation of the machine; Fig. 9 is a plan view; Fig. 10 is a vertical central longitudinal section of the machine shown in Fig. 9; Fig. 11 is an enlarged detail of the magazine for holding the unstrung tags; Fig. 12 is a section on the line 12—12, Fig. 11; Figs. 13 and 14 are enlarged details of the magazine and tag-presenting mechanism; Fig. 15 is a section on the line 15—15, Fig. 16; Fig. 16 is a fragmentary view of the devices for presenting the string to the threading needle; Fig. 17 is a detail of the string-clamping means; Fig. 18 is a sectional plan view on the line 18—18, Fig. 8, showing the operating mechanism for the loop spreader; Fig. 19 is an underside view of the loop spreader; Fig. 20 is a fragmentary view of the string-holding member of the knotting instrumentalities; Fig. 21 is a fragmentary plan view partly in section showing the stringing hook and knot-tying grippers with their operative parts; Fig. 22 is a view showing partly in elevation and partly in section the parts shown in Fig. 21; Figs. 23 and 24 are views of the loop-forming element of the knotter showing it in different positions; Fig. 25 is a section on the line 25—25, Fig. 24. Fig. 26 is a detail view of the means for operating the threader, Fig. 27 is an enlarged section on lines *a—a* Fig. 8. Fig. 28 is a view showing the operation of the string winding means, Fig. 29 is a fragmentary view of the string presenting element and threader, Fig. 30 is an enlarged section through the string guiding block, Fig. 31 is a plan view of said block, Fig. 32 is a diagram plan view showing the relative positions of the successive tags during the stringing and knot tying operations.

As stated above, the machine herein illustrated is designed not only to string the tag, but also to tie a knot in the string. Before proceeding with a detailed description of the parts of the machine, I will refer briefly to Figs. 1 to 7 which illustrate the various steps carried out in stringing the tag and tying the knot therein. The tag to be strung is shown at 1 and in the machine herein illustrated it is held in a horizontal position during the stringing and knot-tying operations. The first step in the operation is shown in Fig. 1, and it consists in presenting a length of string 2, which is doubled on itself, as illustrated, to a threading implement 3 in the form of a helical needle having a string-receiving notch 4 in its end. This needle is turned about its axis from the position shown in Fig. 1 to that shown in Fig. 2, and during this movement the notch 4 thereof engages the loop of the string 2 and carries said loop through the eye 5 of the tag 1, the string at this time being carried around underneath a string-guiding block 6. When the parts have reached this position a loop spreader 7 is advanced directly underneath the point of the needle into the loop 8, said spreader having the general shape shown in Figs. 3 and 19 and operating not only to spread the loop but also to pick said loop off from the threader 3. The needle is then retracted and a stringing hook 9 is advanced through the spread loop 8, as shown in dotted lines Fig. 3, said hook having a throat 10 adapted to receive the two strands of the string 2. This stringing hook 9 which will be more fully hereinafter described seizes the two ends of the string 2 and then is retracted, as shown in Fig. 4, thus drawing the ends of the string through the loop 8. This completes the stringing of the tag. The tying of the knot 11 in the end of the string 2, as shown in Fig. 7, is accomplished by knot-forming instrumentalities shown diagrammatically in Figs. 5 and 6. These comprise a string-holding device 12 which is constructed to grip the string 2 between the stringing hook 9 and the tag, as shown in Fig. 5, a looping member 13 adapted to receive the ends 14 of the string and loop them about the main portion thereof, and knot-tying grippers 15 which are constructed to seize the ends 14 of the string and draw them through the loop 166 formed by the looping element 13, as shown in Fig. 6. At this time the tag is held by a tag hold-down 16 which, together with the knot-tying grippers 15, has a bodily movement relative to a stationary post 17 which engages the string 2, so that said bodily movement will serve to tighten the knot. These various instrumentalities, which are only shown diagrammatically in Figs. 1 to 7, are sustained on a suitable framework 18 in which is journaled a main shaft 19 carrying various cams and other elements for giving proper movement to the stringing and knot-tying instrumentalities. The shaft 19 may be driven in any suitable way and is herein shown as provided with a belt pulley 20 for this purpose. The tags 1 to be strung are sustained in a magazine, and provision is made for feeding the tags one at a time from said magazine into position to have the string 2 threaded therethrough by the threading needle 3. This threading needle 3 has a general helical shape, as above stated, and is carried by a shaft 21 journaled in bearings 22 carried on the frame. This threader is given its oscillatory movement by means of a gear sector 24 meshing with a pinion 25 fast on the shaft 21, said sector being carried by an elbow lever 26 pivoted to the frame at 27, and one arm of which carries a roll 28 operating in a cam groove 29 in a cam member 30 fast on the shaft 19. Inasmuch as the threader 3 has a general helical shape, as shown in Fig. 16, it is necessary to move the shaft 21 longitudinally as it turns in order that the threader may properly enter the eye of the tag. This longitudinal movement of the shaft is secured by providing the latter with a spiral rib 31 which operates between two guiding rolls 32 carried by the bearing 22. The pitch of the spiral rib 31 is the same as the pitch of the threader 3, and hence as the shaft 21 turns, it will be moved longitudinally so that the threader will pass through the eye of the tag without moving the tag from its proper position.

The magazine in which the unstrung tags are received is shown generally at 33, and is best illustrated in Figs. 8, 9, 11, 13 and 14. This magazine comprises two side members 34 between which the tags 1 are received, as shown in Fig. 11, and two bottom plates 35 on which the tags are supported. Each plate 35 has rising therefrom a lip or shoulder 36 of the thickness equal to that of one of the tags 1. These plates 35 are mounted for movement toward and from each other and also for longitudinal movement, the movement toward each other operating to grip the edges of the lowermost tag, and the longitudinal movement operating to withdraw said lowermost tag from the magazine into position to be engaged by a tag-feeding member that feeds the tag forwardly into the proper position for the threader 3 to pass through the eye 5 thereof. The magazine is open at the top to permit the tags to be placed therein, and the sides 34 thereof are provided with positioning ribs 37 against which the end of the tags engage, said ribs positioning the tags in the magazine. The front of the magazine is constituted by a transversely-extending member 39 which is provided at its lower edge with a flange or lip 38 on which the front end of the stack of tags is supported, the body of the stack being supported on the plates 35 above described. The tops of the gripping shoulders 36 engage the bottom of the side walls 34, and the bottom of each positioning projection 37 is in line with the bottom of the side walls, so that there will be a space directly beneath the positioning ribs equal to the thickness of a tag, as seen in Fig. 11. When the magazine is filled with tags, the bottom tag rests on the plates 35 between the shoulders 36, and the front end thereof rests on the lip 38, as seen in Fig. 14. During the operation of the machine the plates 34 are moved toward each other to bring the shoulders 36 against the edge of the lowermost tag with sufficient pressure to grip the tag between them and then said plates move rearwardly thereby withdrawing the lowermost tag from the stack beneath the ribs 37, as shown in Fig. 13, said ribs holding the other tags from any movement. This rearward movement of the plates is sufficient to draw the front end of the lowermost tag off from the lip 38 into a position to be engaged by a tag feeding member 41. When the parts are in this position a thin-edged tag-separating member 42 is moved forwardly over the end of the lowermost tag, thus separating said tag from the stack of tags and pressing the eye end of the tag downwardly to force the eye over the feeding finger 40 formed on a tag feeding member 41 as shown in Fig. 13. This tag-separating member is pivotally mounted on the frame at 68, see Fig. 9, and is given its movement by means of a grooved cam 69 which engages a roll on the end of an arm 70 depending from the member 42, as seen in Figs. 9 and 10. When the tag has been thus speared by the finger 40, the tag-feeding member 41 is moved forwardly into the position shown in Fig. 14, thus carrying the lowest tag into position to have the threader 3 pass through the eye thereof.

Any suitable means may be employed for giving the tag-gripping plates 35 their required movement to withdraw the bottom tag from the stack and for giving the tag-feeding member 41 its movement. In the construction herein illustrated the two plates 35 are mounted on swinging members 43 which are pivoted at 44 to a suitable bracket 45 secured to the frame, and these members are connected by a spring connection 46 which tends normally to draw them toward each other, said spring being the means for giving the plates 35 their tag-gripping motion. Each member 43 is provided with a cam surface 47 which coöperates with a cam arm 48 mounted on a rock shaft 49 carried by the frame, and this shaft 49 has an arm 50 fast thereto provided with a roll which is actuated by a cam 51 mounted on the shaft 19. The action of the spring 46 in tending to draw the members 43 toward each other serves as a means for keeping the roll of the arm 50 in contact with the cam surface of the cam 51, and said cam is so timed and shaped that the plates 35 are held separated from each other until the proper time in the cycle of operations when a tag is to be withdrawn from the bottom of the stack, at which time the roll of the arm 50 passes off from the cam surface, thus allowing the spring 46 to bring the plates 35 toward each other into a position to cause the shoulders 36 to grip the edges of the lowermost tag. After the plates have been moved backwardly to withdraw the lowermost tag and the tag is properly impaled on the finger 40, as shown in Fig. 13, then the cam 51 operates on the cam arm 50 to rock the shaft 49 and thereby through the cam arm 48 moving the members 43 away from each other to release the lowermost tag.

In the present embodiment of my invention the plates 35 are given their longitudinal movement by the means which moves the feeding finger 41. This finger 41 is shown as pivotally mounted on a slide 52 operating in suitable guideways formed in the frame and actuated by means of a cam 53 fast on the shaft 19. For this purpose the cam is provided with a cam groove 54 engaging a roll 55 carried by a lever 56 pivoted at 57 to the frame, said lever being connected to the slide 52 through a link 58. The slide 52 is shown as guided at its rear end in a guideway 59 formed in the frame, and at its front end it is guided in a guideway formed in a block 60, the latter having a dove-tailed guideway 61 therein in which plays a correspondingly-shaped projection 62 formed on the slide. The plates 35 are secured to the members 43 in such a way as to permit the plates to move longitudinally on said members, this being herein provided for by providing the plates with slots 63 through which pass screws 64 that are screw-threaded into the members 43. This provides for the requisite longitudinal movement of the plates 35 relative to the members 43, but compels said plates 35 to move laterally with the members 43. The slide 52 is provided with two lateral projections 65 that operate beneath the adjacent edges of the plate 35, and each plate has depending therefrom two pins or projections 66, 6, as seen in Fig. 9. During the latter part of the backward movement of the slide 52, the projections 65 thereon will engage the pins 67, thereby giving the plates 35 a rearward movement, and during the latter part of the forward movement of the slide 52, the projections 65 will engage the pins 66 and restore the plates to their normal position. The movements of these parts are so timed relative to each other that during the backward movement of the slide 52 the plates 35 are given their movement toward each other to grip the lowermost tag, so that when the projections 65 engage the pins 67 the backward movement thus given to the plates 35 will withdraw the bottom tag from the stack, as seen in Fig. 13. During the movement of the slide 52 from the position shown in Fig. 13 to that shown in Fig. 14, the plates 35 are returned to their initial position ready to receive another tag by the engagement of the projection 65 with the pin 66. When the lowermost tag has been fed forward into position to be strung by the threader, the eye end of the tag rests on a supporting surface 71 and the tag is situated underneath a hold-down plate 235, this being the position of the tag shown in Fig. 14. At this time the finger 40 is withdrawn from the eye of the tag and the slide 52 is then moved rearwardly in order to feed another tag forward.

The following means are employed for controlling the position vertically of the member 41: As stated above this member 41 is pivoted at 72 to the slide 52, and it is provided with a laterally-extending pin 73 operating in a groove 74 formed in the frame. The forward end 75 of this groove is widened and it supports a switch cam in the form of a spring member 76 secured to a projection 77, so that when the member 41 moves to the right, Fig. 13, it will pass over the top of the switch cam 76 and will be held thereby in its elevated position in engagement with the tag 1. When the member 41 reaches the limit of its right-hand movement, it is moved downwardly to withdraw it from the tag and on its rearward movement it passes underneath the switch cam 76, the free or left-hand end of the latter yielding to permit the pin 73 to pass out from under it. For insuring that the member 41 will have its downward movement to withdraw the finger 40 from the tag, I have provided a swinging arm 78 pivoted to the frame at 79 and formed with the hooked end 80 which is adapted to engage a finger 81 formed on the member 41. This arm 78 has rigid therewith an arm 82 which is actuated by a path cam 83 carried by the shaft 19. Said cam is so timed that just before the slide 52 and member 41 reach the forward or right-hand end of their movement the pull-down 78 will be raised into the dotted line position Fig. 13, so that when the member 41 completes its movement the finger 81 thereof will be engaged by the hook 80. At this time the cam 83 actuates the arm 82 to swing the member 71 downwardly into the position shown in Fig. 14, thus withdrawing the finger 40 from the tag. The member 78 is held in this position while the slide 72 moves rearwardly, and the pin 73 of the member 41 will thus be carried underneath the switch cam 76.

It will thus be seen that I have provided means for withdrawing the lowermost tag from the stack, separating said tag from the remaining tags of the stack and then feeding said tag forwardly into position to be strung.

As stated above, the string 2 is threaded or strung through the eye of the tag by means of the curved helical threader 3. Suitable means are also provided for presenting a proper length of string to the threader so that the latter in its movement will take said length of string and carry it through the eye 5 of the tag. This string-presenting mechanism is constructed to measure and cut off a length of string and form said length into a loop which is presented to the threader 3. Said string-presenting mechanism comprises a swinging arm 84 mounted on a shaft 85 journaled in suitable bearings 86 and connected to and driven from the shaft 19 by means of a sprocket chain 87. This arm 84 is provided at its outer end with a string-guiding eye 88 situated axially of the shaft 85. The string which is taken from any suitable source of supply is threaded through the eye 89 and thence through the eye 88. Coöperating with the arm 84 is a string clamp and cutter shown best in Figs. 15 and 16. This comprises a block 90 mounted on the portion 91 of the frame and having formed therein a transverse string-receiving groove 92 situated to have the string 2 laid therein by the rotative movement of the arm 84. This block 90 is formed with a fixed string-clamping member 93 and with a fixed shearing edge 94. The fixed clamping member 93 coöperates with a movable string-clamping member 95 slidably mounted in suitable guides in the block, and the shearing edge 94 coöperates with a cutting knife 96 also slidably mounted in the block 90. The clamping member 95 and shearing knife 96 coöperate to cut off a measured length of string to be strung into the tag and to hold the end of string from which the measured length is severed while the next succeeding length of string is being measured off.

The means herein shown for operating the knife 96 and clamping member 95 are as follows: The block 90 has journaled therein a rock-shaft 97 which has extending laterally therefrom a pin 98 that extends through an opening in the body of the knife 96 so that rocking movement of the shaft 97 will give the knife 96 its reciprocating movement. This pin 98 also extends through a slot 99 formed in the clamping member 95 and the latter is acted upon by spring 100 which tends to urge it toward the fixed clamping member 93. When the shaft 97 is turned clockwise, Fig. 15, the first movement thereof will withdraw the knife 96 until it clears the shearing edge 94, and then the pin 98 will bring up against the slot 99 so that further turning movement of said rock-shaft will withdraw the clamping member. When the shaft 97 is moved in the opposite direction, the knife 96 and clamping member 95 will move together, the latter being urged forward by the spring 100, until the clamping member comes into position to clamp the string against the fixed clamping member 93, as shown in Fig. 15, and as the shaft 97 continues its turning movement the knife will be advanced to cut the string. In Fig. 15 the end of the string shown is that leading to the source of supply and the operations above described are those performed in cutting off a measured length of string.

As stated above, the string 2 leading from the clamp in Fig. 15 leads to the guide eyes 88 and 89 of the arm 84, and as the latter turns the string is drawn through said eyes, and during the complete turning movement of the arm, it is carried around a loop former and presenter 101, herein shown in the form of a curved member having a string-receiving notch 102 in its end. (See Fig. 28.) The notched end of this loop former and presenter is forked, as shown best in Fig. 16, the purpose of which will presently appear.

It will now be understood that assuming one end of the spring 2 is gripped by the clamp 93, 95, the rotation of the arm 84 will carry the string around the loop presenter 101 and back to the clamping member again thereby measuring off a length of string 2 which extends from the clamp 93, 95 to the string presenter and back to the guide eye 88, this being the length of string which is strung into the tag. As the arm 84 completes its revolution and the guide eye 88 passes the block 90, the knife 96 and clamping member 95 are withdrawn, thereby releasing the end of the measured length of string 2 and opening the throat or passage 92 for the reception of the string. When the string has been laid into the groove or passage 92, the clamp 95 is again rendered operative to clamp the string, and the knife 96 comes into play to sever the string, thus cutting off the measured length while retaining the end of the next length in the clamp. This is herein accomplished by providing the rock-shaft 97 with an arm 103 which is situated to be engaged by the upper end of the arm 84 as the latter rotates so that as the arm 84 wipes by the arm 103, it will give the rock-shaft 97 the requisite turning movement to open the clamp and withdraw the knife. The return movement of the clamp and knife is effected by the spring 100 acting on the clamping member 95 and a spring 104 acting on the shaft 97. It will thus be seen that upon each complete rotation of the arm 84 a length of string will be measured off, laid about the string presenter 101 and severed by the knife 96. This length of string is thus in the form of a loop situated directly above the threader 3. The presenter 101 is mounted for movement toward and from the threader 3 and means are provided for moving the notched end of said presenter downwardly after the length of string has been laid thereabout and severed, thereby to bring the loop formed in the string by the loop presenter 101 into position to be engaged by the notched end of the threaded 3 as the latter rotates. This curved thread presenter is shown as parti-circular in shape and as operating in a curved guideway 105 formed in a block 106. Any suitable means for giving the presenter its requisite movement may be employed. In the construction herein illustrated said presenter has a link 107 connected thereto which in turn is pivotally connected to a lever 108 pivoted to the frame at 109 and operated by a cam surface 110 formed on the cam member 111 carried by the shaft 19. After the length of string 2 has been severed it is desirable to subject it to sufficient tension to hold it taut on the string presenter 101 while the latter is moving downwardly to carry the string into position to be engaged by the threader 3. This is herein accomplished by a tension device comprising a roller member 112 carried by a bracket 113 secured by the frame and a coöperating clamping member 114 which is sustained on an arm 115 slidably mounted in the bracket, the member 114 and arm 115 constituting a T-shaped device. As the length of string is being measured off by the arm 84 and given its loop formation, as shown in Fig. 16, the clamping member 114 is separated from the clamping member 112, as shown in dotted lines, Fig. 17, so that the string forming the two sides of the loop will be carried into the space between the clamping members.

Before the length of string is severed, as above described, the clamping member 114 moves into clamping position so as to maintain the string taut between the string presenter 101 and the tension device. The clamping or friction member 114 is acted upon by a spring 116 which tends to move it into its operative position and it is moved forwardly at the proper time by means of a cam 117 mounted on the shaft 85 that carries the arm 84, said cam operating in a groove formed in the arm 115. This cam is so designed that it will positively force the member 114 forwardly, while the string is being laid about the string presenter 101, and will release the member to permit the spring 116 to move it into operative position when the length of string has been measured and severed. If desired, I may make the roller member 112 with right and left hand spiral corrugations thereon so that as the string is drawn through the tension device and the friction of the string causes the roller member 112 to turn, the spiral grooves therein will bring the ends of the string toward each other.

As the string presenter 101 moves downwardly it carries the loop of string 2 into position to be engaged by the notched end of the threader 3 and the mechanism for operating the threader is so timed as to move the threader forwardly at the proper time to pick the string off from the string presenter 101. During this movement of the threader the end thereof passes through the forked end of the string presenter, this construction being provided to permit the threader to engage properly the loop of string. After the string has been taken from the string presenter by the threader, said string presenter is retracted and the threader continues its forward movement to carry the looped string through the tag, as shown in Fig. 2. Coöperating with the threader is a block 6 having a curved guideway 228 around which the threader passes in its turning movement and around which the loop of string is carried, as clearly seen in Fig. 2. When the looped string has thus been carried through the eye of the tag and around the block 6, as shown in Fig. 2, the loop 8 of the string is engaged by a loop spreader 7 which holds the loop while the threader retracts and while the stringing hook 9 is passed through the loop to draw the ends of the string therethrough, as above described. This loop spreader 7 is constructed with a pointed portion or beak to enter the loop and is herein shown as carried by a shaft 118 suitably journaled in the frame. This shaft is given its requisite movement for moving the loop spreader into and out of the loop by means of a gear 119 fast on the shaft which meshes with a segment gear 120 carried by a member 121 that is pivoted to the frame at 122. This member 121 is given its turning movement by means of a slide 123 which is slidably mounted in a guideway 124 formed in the portion 125 of the frame and actuated by a lever 126 which is pivoted to the frame at 109 and is controlled by a cam surface 127 mounted on the cam member 110. The lever 126 is connected to the slide 123 by means of a link 128, and said lever is held in contact with the cam surface by means of a spring 129. The connection between the slide 123 and the member 121, by which longitudinal movement of the slide turns the lever, is constituted by a pin 130 secured to the slide and operating in a cam slot 131 formed in the member 121, so that longitudinal movement of the slide will give the proper turning movement to the member 121 and thus to the loop spreader.

The loop spreader has associated therewith a stripping plate 132 which operates to strip the loop from the spreader when the latter is retracted. The loop spreader is also mounted for vertical movement and is given its vertical movement after it has entered the loop to spread the latter, and in order to lengthen the loop and provide more room for the operation of the stringing hook. This vertical movement of the looper is herein provided for by making the slide 123 with the two bevel fingers 134 that engage a collar 135 formed on the shaft 118, as the slide moves forward. The construction of the slot 131 is such that the turning movement of the member 121 is effected during the first part of the forward movement of the slide and before the bevel fingers 134 operate to lift the shaft 118. After the looped string has been inserted through the eye of the tag and the loop has been spread, the next step in the operation is the completion of the stringing which consists in drawing the free ends of the looped string through the loop 8 thereof, as shown in Fig. 4. This is accomplished by the stringing hook 9, as above stated. This stringing hook 9 is provided with the open throat 10 and is secured to a slide 137 operating in a suitable guideway in the frame and carrying rack teeth 138 that mesh with a pinion 139 mounted on the shaft 140. This shaft carries another pinion 141 which meshes with a gear segment 142 carried by an elbow lever 143 pivoted to the frame at 144 and actuated by a cam groove 145 formed in the cam member 146 mounted on the shaft 19. It will be understood that the cam groove 145 is so shaped and timed as to give the stringing hook its forward movement through the loop 8 at the proper time and then its retracting movement to draw the ends of the string 2 through said loop 8, as shown in Fig. 4. The end of the stringing hook 9 is beveled slightly, as shown at 147, and the means for handling the string operates in such a way that when the hook advances into the dotted line position Fig. 3, the two ends of the string which are held under tension by the tension device 114 will wipe by the beveled end 147 of the hook and will be carried into the open throat 10 thereof so that on the backward movement of the hook 9 the string will be drawn through the loop 8.

In order to effectively draw the string through the loop 8 it is desirable to have the string gripped by the hook so as to prevent the string ends from becoming disengaged from the throat 10. This is herein accomplished by a gripping member 148 in the form of a pin slidable axially through the hook 9 and adapted to be moved into gripping engagement with the string ends occupying the throat 136 during the backward movement of the hook.

Means are provided for withdrawing the gripping finger 148 to open the throat 136 when the hook moves forwardly and to give the finger 148 a movement to grip the string when the hook moves backwardly. This is herein accomplished by a friction spring 149 which is secured to the finger 148 and which frictionally engages a portion 150 of the frame. To provide for attaching the spring to the finger 148, the latter is extended beyond the rear end of the hook 9 and has a block 151 rigid therewith to which the spring 149 is secured. The block 151 is capable of having a slight movement between the end of the hook 9 and the arm 152 through which the end of the finger 148 slides, and in the operation of the machine when the carrier 137 is moved forwardly or to the left, Fig. 22, the friction of the spring 149 against the frame is sufficient to hold the finger 148 from movement until the block 151 has brought up against the finger 152, after which the finger moves with the hook, this movement being sufficient to open the throat 10. When the hook moves backwardly from the dotted line position, Fig. 3, to the full line position, Fig. 4, or to the right, Fig. 22, the drag or friction of the spring 149 against the frame will hold the finger 148 stationary until the string is clamped thereby. After the tag is thus strung a knot 11 is tied in the ends of the string, as shown in Fig. 7. At this time it is necessary to withdraw the string from the block 6 about which it has been looped, and for this purpose, said block is made in two parts 153, 154, the part 153 being stationary and the part 154 being movable laterally. This block section 154 is carried by an arm 155 pivoted to the frame at 156, and it has connected thereto a link 157 which is pivoted to a lever 158 loosely mounted on a shaft 159 carried by depending brackets 160 on the frame, said lever being acted upon by a cam 161 mounted on the shaft 19 and also by a spring 162 which holds the lever against the cam. These parts are so constructed that when the tag has been strung, as shown in Fig. 4, the block section 154 is moved away from the stationary block section 153 so as to allow the string which has been looped about the block to be withdrawn therefrom between the block sections. As the string ends are drawn through the loop 8 by the stringing hook 9 they are carried into a knotting looper by which they are looped about the body of the string to form the loop 166, Fig. 6, and thereafter knot-tying grippers 15 engage the ends 14 of the string and draw them through the loop 166 to form the knot. This knotting looper is shown generally at 13 and it is in the form of a cylindrical member rotatably mounted in a block 167 fixedly secured to the frame, and it is provided in one side with a throat 168 into which the ends 14 of the string are drawn as the stringing hook 9 is retracted. These ends 14 are then gripped in this throat 168 and the member 13 is turned about its axis to form the loop 166 in the string. It will be understood, of course, that the stringing hook 9 is moved axially through the knotting looper 13. This looper 13 is provided on one side of the throat 168 with a fixed jaw 169, and coöperating with the jaw 169 is a movable jaw 170 which is opened automatically away from the jaw 169 when the looper 13 turns in one direction, and is moved toward said fixed jaw 169 to clamp the string ends thereagainst when the member 13 turns in the opposite direction. To accomplish this the jaw 170 is carried by a curved member 171 which is frictionally mounted in an annular groove 172 formed in one end of the member 13. This member 171 is provided with an exterior concentric friction surface 173 which is engaged by a brake 174 pivoted at 175 to the block 167 and acted upon by a suitable spring 176. The curved member 171 is adapted to have a slight turning movement relative to the looper 13, and with this construction when the looper turns in the direction of the arrow $a$, Fig. 23, the friction of the brake 174 on the member 171 will hold it stationary until the jaw 170 is engaged by the jaw 169, after which the two parts will turn as a unitary structure. Similarly, when the member 13 moves in the opposite direction, the jaws will be opened automatically as far as permitted, after which the parts will turn as a unitary structure. The looper is shown in Fig. 23 in the position it occupies while the string ends 14 are being drawn through the loop 8, and during this movement said ends will pass into the throat 168, it being understood that the jaws 169 and 170 are opened away from each other. This is the position of the parts indicated in diagram in Fig. 9. When the string has been moved into this position the looper 13 is given a turning movement in the direction of the arrow $a$, Fig. 23, or in the direction of the arrow in Fig. 5, to carry the ends 14 of the string about the body thereof and form the loop 166. While the knotting looper 13 is thus looping the ends 14 of the string about the body thereof, said body of the string is held stationary in position by means of a string-holding device 12 which will be presently described. The looping member 13 is given its rotative movement by means of a rack-bar 178 operating through the block 167 and the teeth of which engage teeth 179 formed on the exterior of the looper. This rack-bar is actuated by a lever 180 pivotally mounted on the shaft 159 and controlled by a face cam 181.

The string-holding device 12 comprises two jaws 183, 184 carried by a swinging member 185 which is pivoted at 186 to the frame. The jaw 183 is fixed to the member 185 while the jaw 184 is formed on a slotted element 187 pivoted to the member 185 at 188, and provided with a slot 189 in which operates a pin 190 carried by a lever 191 pivotally mounted on the shaft 159 and controlled by a cam 192. The lever 191 is thus given an oscillatory movement which operates both to swing the member 185 into and out of operative position and also to swing the element 187 about its pivot to open and close the jaws. 193 is a spring confined between the movable element 187 and an abutment 194 formed on the swinging member 185, said spring operating normally to hold the jaws or nippers open. When the lever 191 is moved forwardly it acts through the pin 190 and member 187 first to swing the member 185 up into operative position with the jaws open, the movement of the member 185 being limited by the engagement of the jaw 183 with the portion 199 of the frame. When the member 185 is in this position the lower jaw 183 has been carried beneath the string extending from the stringing hook 9 to the tag, and further movement of the lever 191 will operate to swing the member 187 against the action of the spring 193 and thereby close the jaw 184 down onto the string. The body of the string is thus gripped and firmly held while the knot-tying looper carries the ends 14 of the string about the body thereof. As the string is being gripped by the string-holding device 12, the stringing hook 9 is moved forwardly, it being understood from the previous description that during such forward movement the holding finger 148 will be retracted due to the friction of the spring 149 against the portion 150 of the frame. This disengaging of the string from the stringing hook is accomplished by means of a pusher 200 carried by the upper end of the lever 191, so that as the lever makes its final forward movement, the pusher will engage the string and remove it from the hook 9. As the looper 13 is operating to loop the ends of the string 14 about the body thereof a pair of knot-tying grippers 15 are moved forwardly over the body of the string, through the loop being formed and into position to seize the ends 14 of the string, as shown in Fig. 6. These knot-tying grippers 15 are mounted on a swinging arm 201 fast on a vertically-extending rock shaft 202 suitably journaled in the frame, said rock shaft having an arm 203 extending therefrom which is actuated by a cam groove 204 in a cam member 305. The cam operates to swing the arm 201 laterally to bring the grippers 15 into position to seize the ends of the thread and then to withdraw the grippers to draw the ends through the loop 166. These grippers 15 comprise two gripping jaws 205, 206, the jaw 205 being fixed to the arm 201, and the jaw 206 being slidably mounted thereon. The shank of the jaw 205 is provided with a slot in which the jaw 206 operates, and by which it is guided.

Means are provided for opening the jaws 205, 206 as they approach the inner end of their movement so that they are in a position to seize the end 14 of the string, and when the jaws have moved into the position shown in Fig. 6, they are automatically closed to grip the string and are then moved outwardly to draw the ends 14 through the loop 166 and complete the knot. The means herein provided for thus opening and closing the jaws is rendered operative by the movement of the carrier or arm 201. As herein shown, the shank of the jaw 206 has an arm 207 extending laterally therefrom to which is connected one end of a spring 208, the other end of the spring being anchored to a finger 209 fixed to the carrier 201. This spring 208 thus serves yieldingly to hold the jaws closed. The arm 207 has pivotally connected thereto a link 210 which in turn is pivoted to one end of an arm 211, the other end of said arm being pivoted at 212 to the arm 201. 213 is a fixed plate or flange carried by a bracket 220 secured to the frame. This plate or flange 213 has pivotally mounted thereon at 214 a member 215 carrying at its outer end a vertically-extending flange or rib 216 that has an inclined position, as shown best in Fig. 21. This member 215 is yieldingly held against the stop 218 by means of a spring 217. The arm or member 211 has depending therefrom a projection 219 situated to engage the flange 216 as the arm 211 swings about its pivot. The parts are shown in Fig. 21 with the arm 201 in its forward position and with the gripping jaws closed onto the ends 14 of the string. As the arm 201 is moved downwardly in Fig. 21, or outwardly laterally by its actuating cam, the ends 14 of the string are drawn through the loop 166 to complete the knot, and during this movement the projection 219 engages the inclined web 216 and moves the member 215 laterally against the action of the spring. When the arm 201 reaches the outer limit of its movement the projection 219 engages a cam rib 221 secured to the plate 213 which operates through the link 210 to move the jaw 206 forwardly thereby opening the jaws to release the string ends 14. When the arm 201 is moved inwardly again to seize the ends 14 of the next string, the projection 219 engages the cam face 216 and because the member 215 is resting against the stop 218, said cam face will operate through the link 210 to move the jaw 206 forwardly thereby to open the jaws preparatory to seizing the ends 14 of the next string. This opening movement of the jaws is, therefore, effected during the final inward movement of the arm 201.

After the knotting grippers 15 have drawn the ends 14 of the thread through the loop 166, the knot is tightened, and this is done by holding the tag firmly while the grippers 15 complete their backward movement. To do this a tag hold-down 16 is provided which engages the tag as the knot is being formed, as shown in Fig. 6, and holds said tag firmly against a supporting plate 230, and a stationary post 17 is also provided which is situated to be engaged by the string 2 during the knot-tightening operation, so that the string will be drawn around the post by the backward movement of the grippers 15. Preparatory to the tag being engaged by the tag hold-down 16, said tag is swung laterally from the position in which the string was looped therethrough into a position to be engaged by the hold-down 16. This lateral movement of the tag is accomplished while it is being strung and before the knot is formed in the string, and it is effected by means of a tag-pushing member 231 which is pivotally connected at one end to an arm 232 rigid with the arm 56, the outer end of this tag-pushing member 231 carrying a projection 233 which operates in a cam groove 234 formed in a plate 213 carried by the frame and situated immediately above the tag being strung. In Fig. 32 I have shown a diagram illustrating these various movements of the tag, the position *a* indicating the tag in the magazine, the position *b* indicating the tag when it is moved forwardly into position to be strung by the threader 3, and position *c* indicating the position of the tag after it has moved laterally by the pusher 231. This lateral movement is effected while the threader 3 is still occupying the eye of the tag, so that the lateral movement of the tag will be about the threader as a center. This lateral movement of the tag from position *b* to position *c* in Fig. 32 occurs during the retracting movement of the slide 52 so that after one tag has been fed into stringing position and is being strung it is moved laterally while the slide 52 is moving backwardly in order to bring up another tag into stringing position. By the time that the second tag has been moved forwardly, the first tag has been completely strung, and the arm 201 begins its outward movement to complete and tighten the knot. The tag hold-down 16 and supporting plate 230 are both carried by the arm 201, so that when the arm moves outwardly to effect the tightening of the knot, the tag also moves, and this draws the string taut around the stationary post 17, as seen in Fig. 6. The tag hold-down 16 is held closed against the tag during the outward movement of the arm 20, and is opened away from the plate 230 during the inward movement of the arm. Said hold-down 16 is shown as pivoted at 237 to the plate 230 from an extension of the arm 201, and said hold-down has rigid therewith a depending arm 238, the end of which is received in a cam groove having the two connected paths 239 and 240 formed in the plate 213. At the outer end of these grooves a resilient switch cam 241 is provided. The arm 238 is shown as acted upon by a spring 242 which tends normally to hold the hold-down in tag-gripping position. When the arm 201 is in its inward position, as shown in Fig. 21, the end of the projection 238 occupies the end of the groove 239, and the hold-down is clamped against the tag. During the outward swinging movement of the arm 201, the projection 238 follows the cam groove 239 which is a curved groove formed on the arc of a circle struck from the shaft 202 as a center. During this outward movement of the arm 201, therefore, the hold-down 16 will be yieldingly held against the tag by the spring 242. When the arm 201 reaches the outer end of its movement, the end of the arm 238 wipes by the spring element 241, and upon the return movement of the arm 201, the finger 238 traverses the groove 240, thus holding the tag-holding member 16 elevated from the plate 230. When the arm 201 reaches the inward limit of its movement the member 16 is closed against the tag, as will be obvious.

It will be remembered that the length of string from the tag to the knot extends through the looping member 13, and in order to provide for removing the string from the looper, I have formed the block 167 with a lateral opening 2400 which is normally closed by a gate 2410 shown as pivoted to the block at 242 and as acted upon by a spring 243 which yieldingly holds it in operative position, as shown in Fig. 23. This gate is situated at a point opposite the position occupied by the throat 168 in the looping element 13 when the loop has been formed and the grippers 15 have moved forward to seize the ends 14 of the string. This is the position shown in Fig. 24. During the formation of the loop 166, the element 13 makes substantially a complete revolution, and after the loop is formed it is turned backwardly into the position shown in Fig. 24, and then brought to rest in this position (the cam for operating the rack bar 178 being properly designed for this purpose) and it remains in this position until the string of the strung tag has been withdrawn therefrom. When the looper 13 comes to rest in the position shown in Fig. 24 the backward movement of the arm or carrier 201 draws the string 2 into the throat 168 and against the gate 2410 and the pressure of the string against the gate is sufficient to swing the gate into the position shown in Fig. 24, thus allowing the string to pass out through the opening or throat 2400. After the string has cleared the looper 13, the operating cam therefor will give it a further movement into the position shown in Fig. 23, which is the position it occupies while the hook 9 is drawing the string through the loop 8, as above explained. It will be noted from Figs. 23 and 24 that the post 17 with which the string engages while the knot is being tightened is situated directly opposite the throat 2400 so that when the string is carried out through the throat it is brought against the post 17.

I claim:

1. In a tag-stringing and knotting machine, the combination with means to insert a loop of string through the eye of a tag, of means to draw the ends of the string through the loop, and means to tie a knot in said ends of the string.

2. In a device of the class described, the combination with means to insert a loop of string through the eye of a tag, of means to draw the ends of the string through the loop, means to carry said ends about the body of the string to provide a knot-forming loop, and means to draw the ends of the string through said knot-forming loop thereby to form a knot.

3. In a device of the class described, the combination with means to insert a loop of string through the eye of a tag, of means to draw the ends of the string through said loop, a rotary looping member to engage the ends of the string and loop them about the body thereof, and means to draw the ends through the loop thus formed thereby to make a knot.

4. In a device of the class described, the combination with means to sustain a tag, of a threader, means to move the threader to carry a loop of string through the eye of said tag and around the edge thereof, means to draw the ends of the string through said loop, and means to form a knot in said ends.

5. In a device of the class described, the combination with means to sustain a tag, of a threader having at its end a string-engaging portion, means to move the string-engaging portion of the threader through the eye of the tag and around the edge thereof thereby to loop a string through said eye and carry the looped end around the edge of the tag, means to draw the ends of the string through said loop, and means to form a knot in said ends.

6. In a device of the class described, the combination with a helically-shaped threader having an end to engage a string and a length less than one complete turn of the helix, of means to move said threader to carry the end thereof through the eye of a tag whereby a loop of string is carried through said eye, means to draw the ends of the string through the loop thus formed, and means to form a knot in said ends.

7. In a device of the class described, the combination with means to sustain the tag to be strung, of a helically-shaped threader situated with the axis of the helix thereof parallel to the plane occupied by the tag, means to rotate said threader about its axis to carry a loop of string through the eye of the tag, means to draw the ends of the string through said loop, and means to form a knot in said ends.

8. In a device of the class described, the combination with a helically-shaped threader, of means to support a tag in a plane parallel to the axis of the helical curve of said threader, means to operate the threader to carry a string through the eye of the tag, and means to form a knot in the ends of said string.

9. In a device of the class described, the combination with a tag-supporting block having an extended curved string-guiding portion, of a curved threader, means to move said threader to cause it to engage a loop of string and carry said loop through the eye of a tag and around the string-guiding portion of the block, and means to draw the ends of the string through said loop.

10. In a device of the class described, the combination with a tag-supporting block having a curved string-guiding portion, of a curved threader, means to move said threader to cause it to engage a loop of string and carry said loop through the eye of a tag and around the string-guiding portion of the block and the edge of the tag to a position on the same side of the tag from which the string entered the eye, a loop spreader to engage the loop and spread the latter, and means to draw the ends of the string through said loop.

11. In a device of the class described, the combination with a tag-supporting block having a curved string-guiding portion beneath the tag-receiving surface thereof, a curved threader, means to move said threader to carry a loop of string downwardly through the eye of a tag and around said string-guiding portion, and means to draw the ends of the string through the loop.

12. In a device of the class described, the combination with a tag-supporting block having a curved string-guiding portion beneath the tag-receiving surface thereof, a curved threader, means to move said threader to carry a loop of string downwardly through the eye of a tag and around said string-guiding portion, a loop spreader to engage the loop of string, and means to draw the ends of the string through said loop.

13. In a device of the class described, the combination with a tag-supporting block having a string-guiding portion of a curved threader, means to move said threader to cause it to engage a loop of string and carry said loop through the eye of a tag and around the string-guiding portion of the block, means to draw the ends of the string through said loop, and means to form a knot in the ends of the string.

14. In a device of the class described, the combination with a tag-supporting block having a curved string-guiding portion, of a curved threader, means to move said threader to cause it to engage a loop of string and carry said loop through the eye of a tag and around the string-guiding portion of the block and the edge of the tag to a position on the same side of the tag from which the string entered the eye, a loop spreader to engage the loop and spread the latter, means to draw the ends of the string through said loop, and means to form a knot in the ends of the string.

15. In a device of the class described, the combination with a tag-supporting block having a curved string-guiding portion beneath the tag-receiving surface thereof, a curved threader, means to move said threader to carry a loop or string downwardly through the eye of a tag and around said string-guiding portion, means to draw the ends of the string through the loop, and means to form a knot in the ends of the string.

16. In a device of the class described, the combination with a tag-supporting block having a curved string-guiding portion beneath the tag-receiving surface thereof, a curved threader, means to move said threader to carry a loop of string downwardly through the eye of a tag and around said string-guiding portion, a loop spreader to engage the loop of string, means to draw the ends of the string through said loop, and means to form a knot in the ends of the string.

17. In a device of the class described, the combination with a tag-supporting block having a curved string-guiding portion, of a curved threader, means to move the threader to cause it to carry a loop of string through the eye of the tag and around said string-guiding portion of the block, a stringing hook, and means to actuate the latter to draw the ends of the string through said loop.

18. In a device of the class described, the combination with a tag-supporting block having a curved string-guiding portion, of a curved threader, means to move the threader to cause it to carry a loop of string through the eye of the tag and around said string-guiding portion of the block, a loop spreader to receive the loop from the threader and spread said loop, a stringing hook, and means to actuate it to draw the ends of the string through said loop.

19. In a device of the class described, the combination with a tag-supporting block having a string-guiding portion beneath the tag-receiving surface thereof, of a curved threader, means to move the threader to carry a loop of string downwardly through the eye of a tag and around said string-guiding portion, a stringing hook, and means to actuate said hook to draw the ends of the string through said loop.

20. In a device of the class described, the combination with a tag-supporting block having a string-guiding portion beneath the tag-receiving surface thereof, of a curved threader, means to move the threader to carry a loop of string downwardly through the eye of a tag and around said string-guiding portion, a loop spreader to engage said loop and spread the latter, a stringing hook, and means to actuate said hook to draw the ends of the string through said loop.

21. In a device of the class described, the combination with a tag-supporting block having an extended curved, string-guiding portion, of a curved threader movable in a direction to carry a loop of string around said string-guiding portion and a reciprocatory stringing hook.

22. In a device of the class described, the combination with a sectional tag-receiving block having a string-guiding portion, of a curved threader, means to move the threader to cause it to carry a loop of string through the eye of a tag and around said string-guiding portion, means to draw the ends of the string through said loop, and means to separate the sections of the block to permit the string to be withdrawn therefrom.

23. In a device of the class described, the combination with a sectional tag-receiving block having a string-guiding portion, of a curved threader, means to move the threader to cause it to carry a loop of string through the eye of a tag and around said string-guiding portion, a stringing hook, means to actuate it to draw the ends of the string through said loop, and means to separate the sections of the block to permit the string to be withdrawn therefrom.

24. In a machine of the class described, the combination with a sectional tag-receiving block having a string-guiding portion, of a curved threader, means to move said threader to cause it to carry a loop of string through the eye of a tag and around said string-guiding portion, a loop spreader, a stringing hook, means to actuate the latter to draw the ends of the string through said loop, and means to separate the sections of the block to permit the strung tag to be removed.

25. In a device of the class described, the combination with means to carry a loop of string through the eye of a tag, of a stringing hook, means to actuate it to draw the ends of the string through said loop, and means associated with said hook and rendered operative by the string-drawing movement thereof to grip the string as it is drawn through the loop.

26. In a device of the class described, the combination with means to carry a loop of string through the eye of a tag, of a stringing hook, means to actuate it to draw the ends of the string through said loop, and means associated with said hook and rendered operative by the string-drawing movement thereof to grip the string as it is drawn through the loop, said means being released on the forward movement of the hook.

27. In a device of the class described, the combination with means to carry a loop of string through the eye of a tag, of a stringing hook, means to actuate it to draw the ends of the string through said loop, and a frictionally-actuated string grip associated with the hook.

28. In a device of the class described, the combination with means to carry a loop of string through the eye of a tag, of a stringing hook, means to actuate it to draw the ends of the string through said loop, and a frictionally-actuated string grip associated with the hook, and rendered operative to grip the string during the string-drawing movement of the hook and to release the string during the forward movement thereof.

29. In a device of the class described, the combination with a tag-receiving magazine provided at one end with a supporting ledge, of means to withdraw the bottom tag from said ledge, other means to feed said tag into stringing position, and means to string the tag.

30. In a device of the class described, the combination with a tag-receiving magazine provided at one end with a supporting ledge, of means to withdraw the bottom tag from said ledge, a reciprocating tag-feeding member to engage said withdrawn tag and feed it into stringing position, and means to string said tag.

31. In a device of the class described, the combination with a tag-receiving magazine provided at one end with a supporting ledge, of means to withdraw the bottom tag from said ledge, a reciprocating tag-feeding member having a finger to enter the eye of the withdrawn tag and feed it into stringing position, and means to string said tag.

32. In a device of the class described, the combination with a tag-receiving magazine provided at one end with a supporting ledge, of means to withdraw the bottom tag from said ledge, a tag-feeding member having a finger to enter the eye of said withdrawn tag, a separator to separate said withdrawn tag from the other tags in the magazine and force the eye thereof over said finger, means to move said feeding member to carry said withdrawn tag into stringing position, and means to withdraw said finger from the tag and means to string the tag.

33. In a device of the class described, the combination with a tag-receiving magazine comprising side walls and having a tag-supporting ledge at one end, of two plates constituting the bottom of the magazine and each having a tag-gripping lip, means to move said plates toward each other to cause the bottom tag in the magazine to be gripped between said lips, means to move the plates longitudinally to withdraw said tag from the supporting ledge, means to release said tag, means to feed the tag into stringing position and means to string the tag.

34. In a device of the class described, the combination with a tag-receiving magazine comprising side walls and having a tag-supporting ledge at one end, of two plates constituting the bottom of the magazine and each having a tag-gripping lip, means to move said plates toward each other to cause the bottom tag in the magazine to be gripped between said lips, means to move the plates longitudinally to withdraw said tag from the supporting ledge, means to release said tag, means to feed the tag into stringing position, and means to string the tag.

35. In a device of the class described, the combination with a tag-receiving magazine comprising side walls and having a tag-supporting ledge at one end, of two plates constituting the bottom of the magazine and each having a tag-gripping lip, means to move said plates toward each other to cause the bottom tag in the magazine to be gripped between said lips, means to move the plates longitudinally to withdraw said tag from the supporting ledge, means to release said tag, means to feed the tag into stringing position, means to string the tag, and means to tie a knot in the string.

36. In a device of the class described, the combination with a string-presenting element, of means to loop a length of string thereabout, a threader, means to move the string-presenting element into position to present the string to the threader, and means to move the threader to cause it to take the loop of string from said element and carry it through the eye of a tag.

37. In a device of the class described, the combination with a string-presenting element, of means to loop a length of string thereabout, a threader, means to move the string-presenting element into position to present the string to the threader, means to move the threader to cause it to take the loop of string from said element and carry it through the eye of a tag, and means to draw the ends of the string through said loop.

38. In a machine of the class described, the combination with a string-presenting element, of means to loop a measured length of string thereabout, a threader, means to move the string-presenting element into position to present the string to the threader, and means to move the threader to cause it to take the loop of string from said string-presenting element and carry it through the eye of a tag.

39. In a device of the class described, the combination with a string-presenting element, of means separate from said element to measure from a source of supply a length of string and loop said length about said element, means to sever said length from the source of supply, and means to clamp the end leading to the source of supply.

40. In a device of the class described, the combination with a string-presenting element, of means to measure from a source of supply a length of string and loop said length about said element, means to sever said length from the source of supply, means to clamp the end leading to the source of supply, means to insert said loop through the eye of a tag, and means to draw the ends of the string through said loop.

41. In a device of the class described, the combination with a string-presenting element, of a string-clamping device separate from said element, a rotary arm having a string guide, rotation of said arm looping a length of string about said element, means to sever said length, a threader to thread said length through the eye of a tag, and means to move the string-presenting element to present said length to the threader.

42. In a device of the class described, the combination with a string-presenting element, of a string-clamping device, a rotary arm having a string guide, rotation of said arm looping a length of string about said element, means to sever said length, means to insert the loop of said length of string through the eye of a tag, and means to draw the ends of the string through said loop.

43. In a device of the class described, the combination with a string-presenting element, of a string-clamping device separate from said element, a rotary arm having a string guide, means to rotate said arm thereby to loop a length of string about said element, a threader to thread said length through an eye of a tag, and means to move the string-presenting element to present said length to the threader, means actuated by movement of said arm to sever said length.

44. The combination with a string-presenting element, of a string-clamping device independent from said element, a rotary arm having a string guide, means to rotate said arm to loop about said element a length of string, one end of which is secured in the clamping device, means to release said end from the clamping device when it has been looped about said element and to sever said length from the source of supply, a threader, and means to move the string-presenting element to present said length to the threader.

45. The combination with a string-presenting element, of a string-clamping device independent from said element, a rotary arm having a string guide, means to rotate said arm to loop about said element a length of string, one end of which is secured in the clamping device, means to release said end from the clamping device when it has been looped about said element to sever said length from the source of supply and to grip the end from which the length was severed, a movable threader, and means to move the string-presenting element to present said length to the threader.

46. The combination with a string-presenting element, of a string-clamping device separate from said element, a rotary arm having a string guide, means to rotate said arm to loop about said element a length of string, one end of which is secured in the clamping device, means operated by the movement of said arm to release said end from the clamping device when it has been looped about said element to sever said length from the source of supply and to grip the end from which the length was severed, a threader to thread said length through the eye of a tag and means to move the string presenting element to present said length to the threader.

47. In a device of the class described, the combination with a string-presenting element, of means movable relative to said element to loop a length of string about said element, means to insert said loop of string through the eye of a tag, means to draw the body of the looped string through the loop thereof, and a tension device acting on the sides of the loop.

48. In a device of the class described, the combination with a string-presenting element, of means to measure from a source of supply a length of string and loop the same about said element, means to sever said length from the source of supply, a tension device operative automatically to engage the sides of the loop of string as it is looped about said element, means to insert said loop through the eye of a tag, and means to draw the body of the string through said loop.

49. In a device of the class described, the combination with means to insert a loop of string through the eye of a tag, of an annular knot-forming looper, means to draw the body of the string through the loop thereby to string the tag and through said looper, means to cause the looper to engage the ends of the string and loop them about the body thereof, and means to draw the ends through the loop thus formed thereby to make a knot.

50. In a device of the class described, the combination with means to insert a loop of string through the eye of a tag, of an annular knot-forming looper having a string-receiving throat, means to draw the body of the string through the loop of the string and through the looper with the ends of the string occupying said throat, means to clamp the string ends in said throat and rotate the looper to loop the ends about the body of the string, and means to draw said ends through the loop thus formed thereby to provide a knot.

51. In a device of the class described, the combination with means to insert a loop through the eye of a tag, of an annular rotary knot-forming looper having a string-receiving throat, a stringing hook, means to move the latter through said looper and through the loop of string thereby to draw the body of the looped string through said loop and looper with the ends of the string occupying said throat, means to clamp the ends of the string in said throat and to turn the looper about its axis to loop said ends about the body of the string, and means to draw said ends through the loop thus formed thereby making a knot.

52. In a device of the class described, the combination with means to insert a loop of string through the eye of a tag, of an annular rotary knot-forming looper having a throat, means to draw the body of the string through said loop and through the looper with the ends occupying the throat, a block in which said looper is mounted for rotation, said block having a normally closed passage, means to cause said looper to grip the ends of the string occupying said throat and to rotate said looper to carry said ends around the body of the string, means to draw said ends through the loop thus formed, said passage providing means for permitting the string to be removed laterally from the looper.

53. In a device of the class described, the combination with means to insert a loop of string through the eye of a tag, of an annular rotary knot-forming looper having a throat, means to draw the body of the string through said loop and through the looper with the ends occupying the throat, a block in which said looper is mounted for rotation, said block having a normally-closed passage, means to cause said looper to grip the ends of the string occupying said throat and to rotate said looper to carry said ends around the body of the string, means to draw said ends through the loop thus formed, means to move the strung tag laterally to withdraw the string through said passage.

54. In a device of the class described, the combination with means to insert a loop of string through the eye of a tag, of an annular knot-forming looper having a string-receiving throat, means to draw the body of the string through the loop thereof and through said looper with the ends of the string occupying said throat, means to rotate the looper, means actuated by the rotation thereof to grip said string ends as the looper begins its rotative movement and to release said string ends when the loop is formed, and means to draw the ends of the string through the loop thus formed.

55. In a machine of the class described, the combination with means to insert a loop of string through the eye of a tag, of an annular knot-forming looper having a string-receiving throat, means to draw the body of the string through the loop thereof thereby to string the tag, and through said looper, means associated with the looper to grip said string ends, means to rotate the looper to loop said ends about the body of the string, a laterally-movable frame, a tag-gripping device sustained thereby, knot-forming grippers also carried thereby, movement of said frame in one direction moving the knot-forming grippers into position to engage the end of the string and movement in the other direction drawing said ends through the loop formed by the looper and simultaneously moving the tag laterally, and an abutment post with which the string engages during such lateral movement whereby the knot is tightened.

56. In a machine of the class described, the combination with means to insert a loop of string through the eye of a tag, of means to draw said string through the loop thus formed thereby to string the tag, a knot-forming looper to engage the ends of the string and loop them about the body thereof, knot-forming grippers, means to move the latter through the knot-forming loops and cause them to seize the ends of the string and draw them through the loop thereby to form a knot.

57. In a machine of the class described, the combination with means to insert a loop of string through the eye of a tag, of means to draw the sides of the looped string through the loop thereof thereby to string the tag, a knot-forming looper, means to cause it to seize the ends of the string and loop them about the body thereof, knot-forming grippers, means to move them toward and through the loop last formed and then backwardly, means to open said grippers during their forward movement whereby they embrace the string ends as they enter the loop and then close them whereby on backward movement they draw the ends through the loop to form a knot.

In testimony whereof, I have signed my name to this specification, in the presence of two subscribing witnesses.

LAWRENCE A. McGRATH.

Witnesses:
 Louis C. Smith,
 Thomas J. Drummond.